United States Patent [19]

Grundler

[11] Patent Number: 4,769,119

[45] Date of Patent: Sep. 6, 1988

[54] WATER TREATMENT

[75] Inventor: Karl A. G. Grundler, Randpark Ridge, South Africa

[73] Assignee: Waterdynamics (Proprietary) Limited, Transvaal, South Africa

[21] Appl. No.: 25,013

[22] Filed: Mar. 12, 1987

[30] Foreign Application Priority Data

Mar. 24, 1986 [ZA] South Africa .................. 86/2161
Jul. 24, 1986 [ZA] South Africa .................. 86/5517

[51] Int. Cl.⁴ ............................................. C02F 1/46
[52] U.S. Cl. .................................................. 204/149
[58] Field of Search ......................................... 204/149

[56] References Cited

U.S. PATENT DOCUMENTS 3,092,566  6/1963  Negus ................................ 204/291

Primary Examiner—T. M. Tufariello
Attorney, Agent, or Firm—Chilton, Alix & Van Kirk

[57] ABSTRACT

A water ionizing device which includes an electrode assembly of three electrodes which are preferably concentric. The center electrode is predominantly of silver and the other two electrodes are of copper. Ions are introduced from the silver electrode into water to be treated for a limited period and thereafter ions are introduced into the water alternatively from the other two electrodes. The device is, optionally, solar powered.

4 Claims, 2 Drawing Sheets

WATER TREATMENT

BACKGROUND OF THE INVENTION

This invention relates generally to the treatment of water. More particularly the invention is concerned with the treatment of water against bacteria and the formation of algae for example in a swimming pool, spa, or similar body of water.

It is known to treat water by introducing metallic ions into the water. An efficient way of doing this is by means of an electrolysis process.

SUMMARY OF THE INVENTION

The present invention is concerned, in the first instance, with a method of operating a water-ionizing device.

In accordance with the invention there is provided a method of operating a water-ionizing device which includes at least a first electrode of a first material and a second electrode of a second material, the method including the steps of introducing ions from the first electrode into the water which is to be treated, for a predetermined period, and introducing ions from the second electrode into the water.

The device may include a third electrode and power may be applied to the first and third electrodes for the predetermined period and thereafter power may be applied to the second and third electrodes.

The power may be derived from a DC source and the polarity of the connection of the DC source to the second and third electrodes may be reversed at intervals. The DC source may be solar powered.

The method may include the step of limiting the current which passes between the second and third electrodes as the total dissolved solid content increases. As the dissolved solid content of the water increases its conductivity increases and, in order to limit or control the rate at which metallic ions are introduced into the water, the voltage which is applied to the electrodes may for example be reduced. This may be done manually by means of a suitable switching arrangement, or automatically by means of a suitable electronic control circuit. The voltage applied to the electrodes, or the current which flows between the electrodes, may be controlled or adjusted to take care of variable factors such as the weather, the season of the year, the size of the water body to be treated, the condition of the water, and so on.

If the water is the water in a swimming pool or similar body of water then the ionizing device of the invention may be mounted in a leaf trap or in a weir or similar location.

The invention further extends to a water-ionizing device which includes a first electrode of a first material, a second electrode of a second material, a third electrode, first means of applying power to the first and third electrodes, for a predetermined period, thereby to introduce ions from the first electrode into water which is to be treated, and second means for applying power to the second and third electrodes thereby to introduce ions at least from the second electrode with the water.

In one embodiment of the invention the second means applies DC power of alternating polarity to the second and third electrodes so that ions are introduced into the water alternately from the second and the third electrodes.

The invention further extends to an electrode assembly for use in a water-ionizing device which includes a first electrode, a second electrode which is generally of tubular form, the first electrode being concentrically located inside the second electrode, and a third electrode which is generally of tubular form and which is concentric with and which surrounds the second electrode.

The second and third electrodes may be of the same material. A suitable composition for these electrodes is:
99% copper
1% trace metals such as cadmium, nickel and chrome.

The first electrode may contain silver. A suitable composition for this electrode is:
at least 50% silver,
at least 14% copper, and
at least 5% cadmium.

The electrodes may depend from one side of an insulating mounting block. The electrodes in use may extend downwardly. The mounting block may include attachment means for mounting the electrode assembly. For example the attachment means may include a bolt which extends upwardly from the mounting block. Cables connected to the electrodes may pass through the bolt.

Means may be provided for monitoring the current which passes through one or more of the electrodes. A reduction in this current implies inter alia that the respective electrode is wearing. Thus in accordance with the invention display means may be provided for indicating the wear of each electrode.

BRIEF DESCRIPTION OF THE DRAWINGS

The invention is further described by way of examples with reference to the accompanying drawings in which.

DESCRIPTION OF PREFERRED EMBODIMENTS

Figure 1:
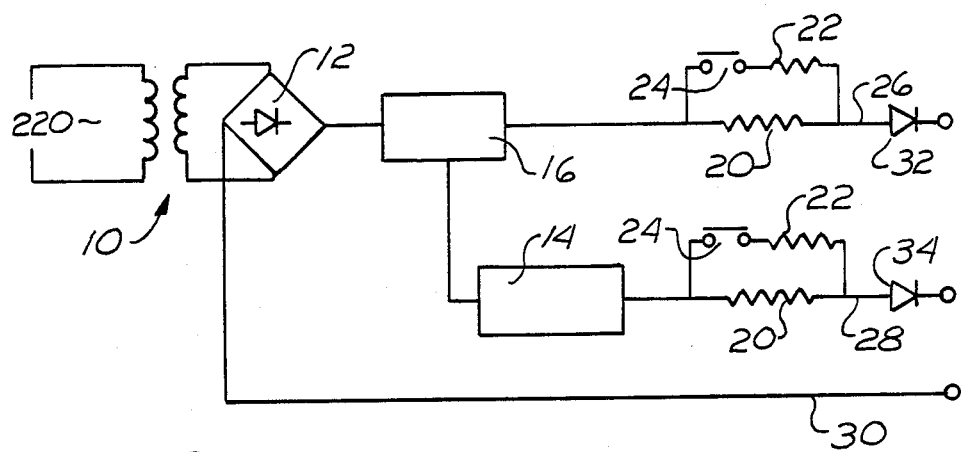
FIG. 1 is a diagram of a circuit used in a water-ionizing device according to the invention.

FIG. 1 illustrates a diagram of a circuit used in the water-ionizing device of the invention. The circuit includes a step down transformer 10 and a rectifier 12 which provide a working DC voltage of from 5 to 20 volts. An astable multivibrator 14 and a monostable multivibrator 16 are powered by the DC supply. A resistor 20 in parallel with a second resistor 22 and a switch 24, is connected in series with the astable and monostable devices 14 and 16, respectively. Three output leads 26, 28 and 30 respectively extend from the two sets of resistors and the power supply. The leads 26 and 28 have light emitting diodes 32 and 34 connected in series with them respectively. The rectifier 12, as is described hereinafter could, optionally, incorporate a constant current source for powering the devices 14 and 16 respectively.

Figure 2:
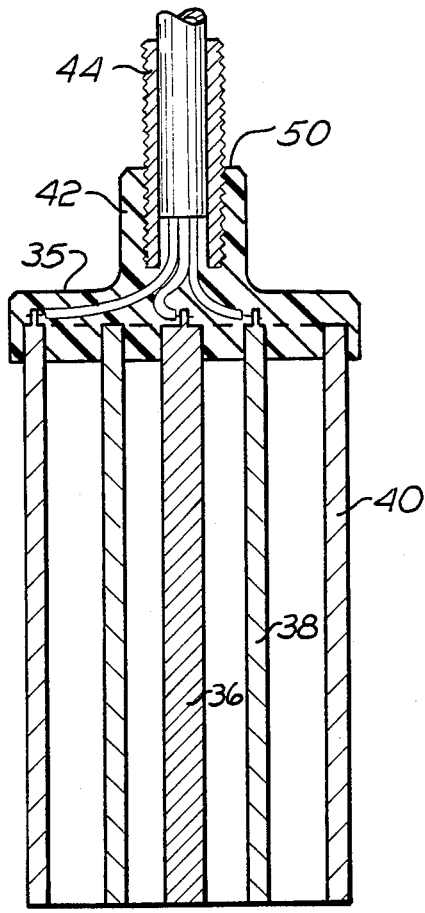
FIG. 2 is a side view of an electrode assembly used in the water-ionizing device of the invention.
Figure 3:
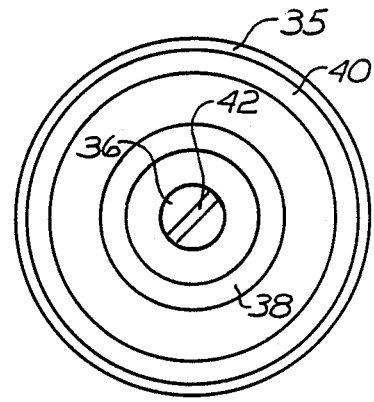
FIG. 3 is a lower plan view of the electrode assembly of FIG. 2.

FIGS. 2 and 3 illustrate the construction of an electrode assembly used in the ionizing device of the invention. The electrode assembly includes a mounting block 35 from which extend a first, central electrode 36, a second, tubular electrode 38 which surrounds the first electrode 36, and a third, tubular electrode 40 which concentrically surrounds the other two electrodes. As is to be noted from FIG. 3 the first electrode 36 has a slotted end 42 so that it can be screwed into the mounting block or unscrewed therefrom, with ease.

The first electrode has a composition of
at least 50% silver,
at least 15% copper, and
at least 5% cadmium.

The second and third electrodes consist of at least 99% copper, with the remaining constituents being trace metals such as cadmium, nickel and chrome.

The upper end of the mounting block 35 has a pedestal 42 in which is mounted a threaded brass connector 44. Insulated wires 46 extend through the connector 44 and are connected to the respective electrodes 36 to 40. The wires 46 consist of the leads 26 to 30.

The electrode assembly shown in FIGS. 2 and 3 is designed to be installed in a leaf trap associated with a water circulation path of a swimming pool or similar body of water. A hole is bored in a lid of the leaf trap and the connector 44 is passed therethrough. It is bolted securely in position with a seal being provided by means of a neoprene washer not shown which bears against an upper shoulder 50 of the pedestal 42. The electrodes then extend downwardly into the water in the leaf trap.

When power is applied to the transformer 10 the monostable device 16 turns on and supplies power to the silver electrode 36 and to the copper electrode 38. The polarity of the supply is such that silver ions are introduced into the water which is to be treated. At the end of its timing interval the monostable device 16 turns off and, simultaneously, turns the astable device 14 on.

When the electrodes 38 and 40 are energized by the astable device 14, copper ions are released from the relevant electrode into the water. The changing polarity of the output signal of the device 14 effectively reverses the polarity of the power applied to these electrodes at regular intervals and, in this way, the release of ions from both copper electrodes is controlled to ensure that both electrodes are wasted evenly.

The light emitting diodes 32 and 34 provide a visual display only if there is current passing between the respective electrodes, in other words provided the electrodes are immersed in water. The intensity of the light emitted by the light emitting diodes is directly proportional to the surface area of the electrodes immersed and consequently the light intensity is inversely proportional to the wastage of the respective electrodes.

If the switches 24 are closed then the resistance between each device 14 and 16, and its electrode, is reduced. In this way low resistance paths are provided which implies higher current and therefore a higher rate of metallic ion release. When the switches are open high resistance paths are provided. This means lower current and therefore a lower rate of ion release. The switches will normally be closed for summer use and open for winter use. Similar arrangements can be adopted to vary the ion release rate depending on the size of the water body to be treated.

The resistors 20 and 22 have values which are sufficiently high to limit the current passing between the electrode pairs as the solid content in the water increases. A high solid content implies higher conductivity and therefore higher current flow. If the current is too high the electrodes waste away rapidly. This is catered for, in this instance, by choosing the values of the resistors so that effectively they swamp the effect of any variations in the water conductivity. In other words the amplitude of the current between the respective electrodes is limited. A similar effect could be achieved, for example, by using a controlled current source to power the two devices 14 and 16. For example the rectifying unit 12 could include a constant current source. Alternatively it is possible to include a constant current source in each of the devices 14, and 16, respectively. The electrode current can also be adjusted by using a control circuit which reduces the output voltage of each device 14 and 16 as the water conductivity increases, or, more simply, by switching in additional resistors at regular intervals thereby to increase the resistance in the current path and so compensate for the reduced resistance between the electrodes.

The apparatus of the invention releases silver ions into the water for a controlled period. The silver ions act as a bactericide and the quantity of ions may further be controlled by means of the respective switch setting. If necessary additional switch settings may be provided to have a wider range of rate of silver ion release into the water. The copper ions on the other hand control the formation of algae in the water. Again the amount of copper ions which are released can be controlled via the respective switch 24. The automatic polarity reversal which is obtained by means of the astable device 14 ensures that the two copper electrodes are evenly wasted. In all cases the current which passes between the respective electrode pairs is controlled in dependence upon the total dissolved solid content.

When one or more of the electrodes are wasted a visual signal is given via the respective light emitting diodes and a new electrode or electrode assembly can be installed in the device of the invention.

Figure 4:
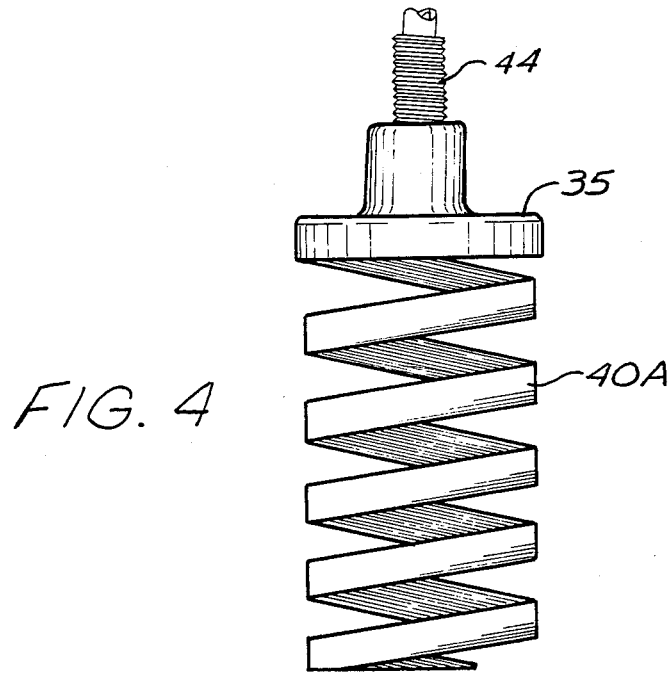
FIG. 4 shows a modified electrode.

Clearly the principles of the invention can take on a variety of forms which embody the principles hereinbefore outlined. Such variations of the invention are however intended to fall within the scope of the present specification. One such variation is shown in FIG. 4 which illustrates an outer electrode designated 40A in a modified form of the electrode assembly of FIG. 2. The electrode 40A is made by winding a copper rod helically into a tubular form. The electrode 40A is used in the same way as the electrode 40 but it has the advantage of being cheaper and, in addition, it permits the free flow of water through it - this encourages the taking up of ions by the water. A similar construction can, of course, be used for both the inner electrodes.

Figure 5:
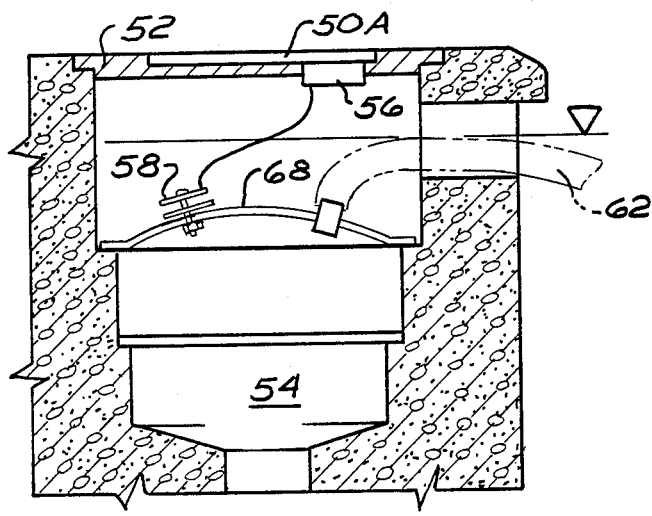
FIG. 5 shows a solar-powered installation of the water-ionizing device.

Another variation is shown in FIG. 5 which illustrates a solar panel, or cell, 50A which is mounted on a lid 52 of a swimming pool weir 54. The solar panel produces energy at a rate which is dependent on the incident solar energy on the panel, and at a voltage which lies in the working range of the circuit shown in FIG. 1. This circuit is indicated by the numeral 56 in FIG. 5.

An electrode assembly 58 is powered by the circuit 56 and is positioned inside the weir on a vacuum lid 60 to which is fitted a flexible hose 62 of a pool cleaning device.

The assembly 58 may alternatively be attached to a wall of the weir and, in this event is, preferably positioned in such a way that the vacuum lid 60 may be removed from the weir without interfering with the electrodes.

It is of course possible to position the solar panel in any other location and in this respect one should bear in mind the need for optimally orientating the solar panel so that it catches the maximum amount of incident radiation.

An advantage of the solar cell version is that it makes it possible to treat water where an electrical supply is not available or where, for some reason e.g. safety, it is not desired to use electricity derived from a mains supply in the water body.

The invention has been described with particular reference to the treatment of swimming pool water. Obviously the invention is not limited to this application for it can be applied to the treatment of any other body of water.

I claim:

1. A method for treating water by means of operating a water-ionizing device which includes a first electrode of a first material, a second electrode of a second material, and a third electrode of the said second material, the method including the steps of:

(a) at the start of an operational cycle, applying a first DC voltage between the first and third electrodes for a predetermined period thereby to introduce ions from the first electrode into the water which is to be treated;

(b) after the said predetermined period, applying a second DC voltage between the second and third electrodes and reversing the polarity of the connection of the second DC voltage to the second and third electrodes at intervals, thereby to introduce ions alternatively from the second and third electrodes into the water; and (c) limiting the current which flows between the second and third electrodes as the total dissolved solid content in the water increases.

2. The method of claim 1 further comprising the step of:

(d) generating said first and second DC voltages by solar power.

3. The method of claim 1 further comprising the step of:

(e) monitoring the current applied to one of said electrodes to determine electrode wear.

4. The method of claim 1 wherein step (b) further comprises serially reversing the polarity of the second and third electrodes at selected intervals to obtain substantially equivalent wear between the second and third electrodes.

* * * * *